J. H. DOWNING.
ATTACHMENT FOR CORN HARVESTERS.
APPLICATION FILED OCT. 1, 1917.
1,259,495.
Patented Mar. 19, 1918.
2 SHEETS—SHEET 1.
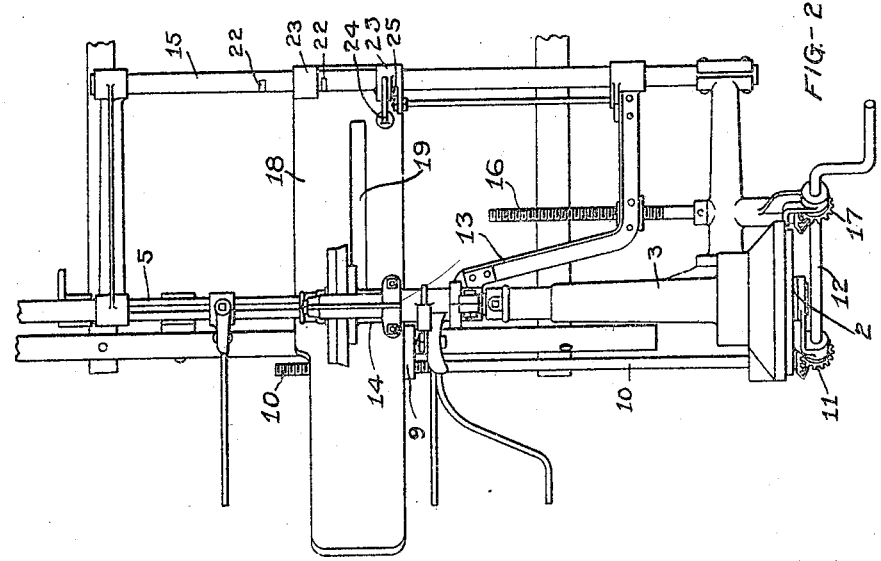
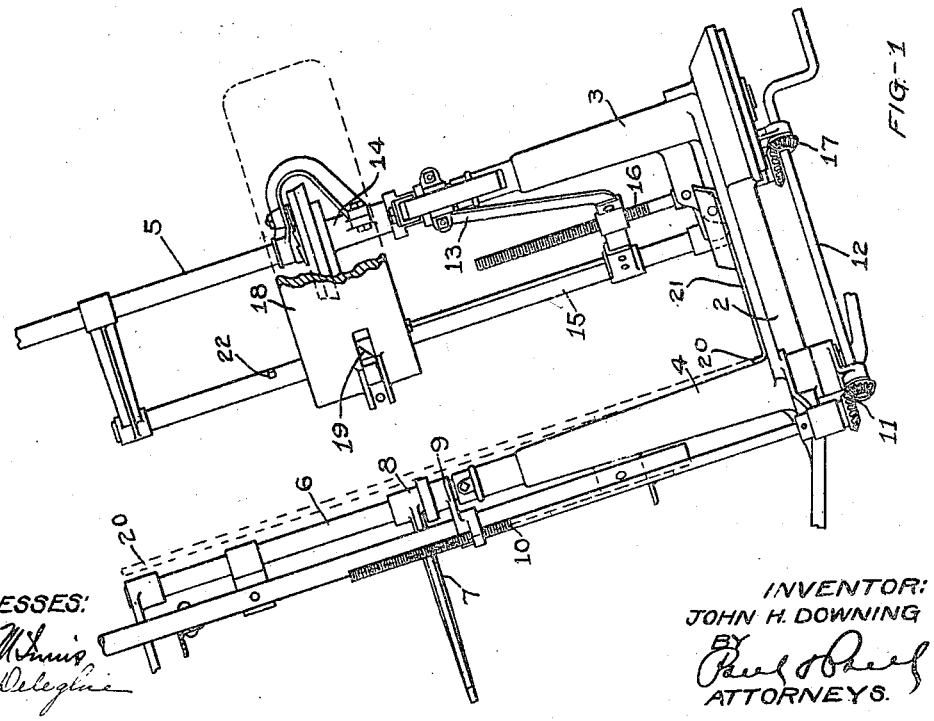
WITNESSES:
INVENTOR:
JOHN H. DOWNING
BY
ATTORNEYS

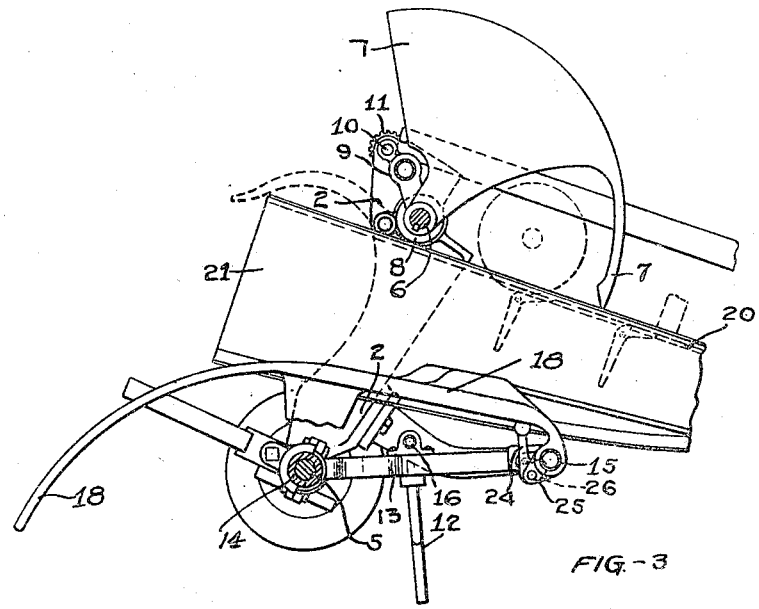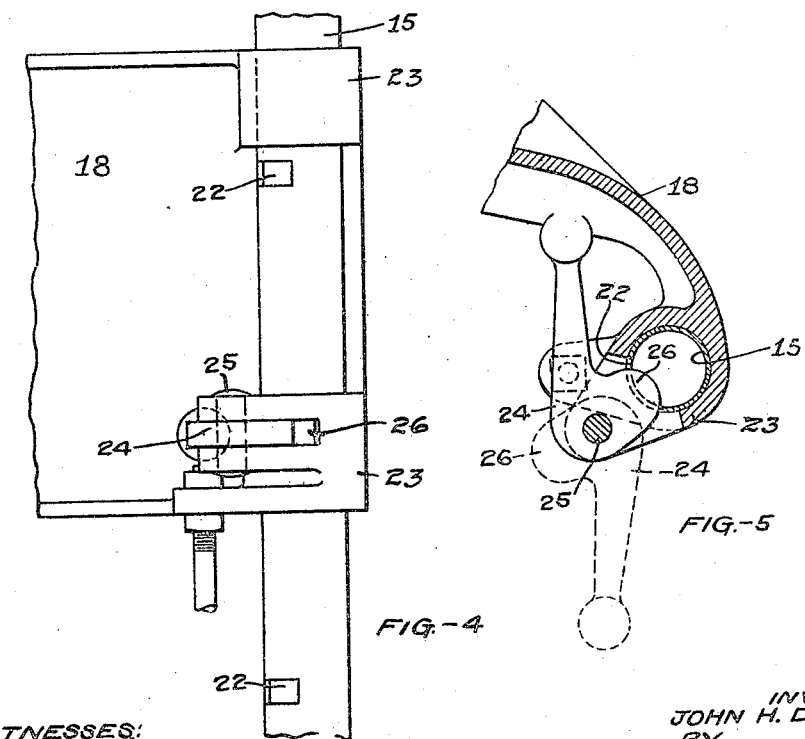

UNITED STATES PATENT OFFICE.

JOHN H. DOWNING, OF MINNEAPOLIS, MINNESOTA, ASSIGNOR TO THE STATE OF MINNESOTA.

ATTACHMENT FOR CORN-HARVESTERS.

1,259,495.  Specification of Letters Patent.  Patented Mar. 19, 1918.

Application filed October 1, 1917. Serial No. 194,282.

*To all whom it may concern:*

Be it known that I, JOHN H. DOWNING, a subject of the King of England, resident of Minneapolis, county of Hennepin, State of Minnesota, have invented certain new and useful Improvements in Attachments for Corn-Harvesters, of which the following is a specification.

In the operation of a corn harvester, it is often desirable to raise or lower the knotter and needle mechanism to properly position them for binding corn stalks of different length and when the proper adjustment has been obtained, some means is necessary for locking the parts in their proper relative position and holding them securely during the binding operation.

The object of my present invention is to provide such a locking device which will be positive and reliable in its action, easily operated and of comparatively simple construction.

The invention consists generally in various constructions and combinations, all as hereinafter described and particularly pointed out in the claims.

In the accompanying drawings forming part of this specification,

Figure 1 is an elevation of a portion of a corn harvester with my invention applied thereto, Fig. 2 is a similar view, looking at the right hand end of the mechanism, as shown in Fig. 1, Fig. 3 is a plan section, showing the relative position of the operating parts, Fig. 4 is a detail view of the guide for the knotter mechanism and the locking device thereon, Fig. 5 is a detail sectional view of the locking device.

In the drawing, 2 represents a portion of the frame of the machine, having the upright standards 3 and 4 thereon in which the knotter and needle shafts 5 and 6 are respectively mounted. The needle 7 has a hub 8 slidable on the shaft 6 and operated through a carriage 9 and an adjusting screw 10, the lower end of which is geared at 11 to a crank 12. A bracket 13 is connected with a sleeve 14 on which the knotter mechanism is mounted and is slidable on a guide 15, it being actuated through a screw 16 which is also geared at 17 to the crank 12. Revolution of said crank will raise and lower the knotter mechanism and the needle simultaneously. A breast plate 18 is carried by the knotter mechanism and is provided with a slot 19 through which the needle operates. As shown in Fig. 3, the needle is on one side of the binder deck 20 and the knotter mechanism on the opposite side, as usual in machines of this type, the corn stalks being carried along on the floor 21 at the bottom of the binder deck. It is, of course, important that the slot in the breast plate be always positioned to receive the needle and that all the parts be securely held during the binding operation. Various devices have been provided for this purpose, but have been found more or less unsatisfactory because of the time required for adjustment or on account of being of comparatively light construction have not proved to be durable or cannot be relied upon to hold the mechanism securely on the guide.

To avoid these objections to the locking devices now in general use, I provide a guide rod 15 with transverse slots 22 at suitable intervals therein and on one of the hubs 23 of the breast plate I mount a lever 24 pivoted at 25 and having a cam lip 26 to enter a slot in the guide 15 and becoming seated therein, will hold the knotter mechanism firmly in its adjusted position, and there will be no possibility of the lever working out of this position while the machine is in use, but in case re-adjustment is desired, it is only necessary to grasp the lever 24, swing it horizontally until its cam lip is clear of the slot, and then the knotter mechanism may be adjusted either higher or lower on its guide as may be desired. Upon setting the mechanism at the desired elevation, the lever may be swung from its dotted line position in Fig. 5 to the full line position and thereby the parts will again be securely locked and positively held against accidental movement.

In various ways the details of construction herein shown and described may be modified and still be within the scope of my invention.

I claim as my invention:

1. In a harvester, a tying mechanism movable vertically for different adjustments and means for locking said tying mechanism in its adjusted positions, including an upright guide rod having a plurality of slots therein, one above the other, a sleeve slidable on said rod and whereto said tying mechanism is connected, and a lever mounted on said sleeve and having means for entering a slot for locking temporarily said tying mechanism.

2. A harvester comprising a tying mechanism adjustable for different lengths of the corn stalks and means for locking said mechanism in its different adjustments, including a guide rod having a series of transverse slots therein, one above the other, a sleeve member slidable on said guide rod and connected with said tying mechanism, a lever pivoted for horizontal swinging on said sleeve and having a cam lip to enter said slots, thereby locking said tying mechanism on said guide rod.

3. In a harvester, a tying mechanism movable vertically for different adjustments and means for locking said tying mechanism in its adjusted positions, including an upright guide-rod having seats formed therein, one above the other, a sleeve slidable on said rod and whereto said tying mechanism is connected, and a cam lever mounted on said sleeve and having a movement transversely of said guide-rod for engaging said seats and temporarily locking said sleeve and said tying mechanism In witness whereof, I have hereunto set my hand this 17th day of September 1917.

JOHN H. DOWNING.

Copies of this patent may be obtained for five cents each, by addressing the "Commissioner of Patents, Washington, D. C."